United States Patent
Kim (10) Patent No.: US 6,653,991 B1
(45) Date of Patent: Nov. 25, 2003

(54) DEVICE AND METHOD FOR CONTROLLING A VIDEO SIGNAL GAIN

(75) Inventor: Jung-Dae Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 422 days.

(21) Appl. No.: 09/662,352

(22) Filed: Sep. 14, 2000

(30) Foreign Application Priority Data

Dec. 24, 1999 (KR) ........................................ 1999-62057

(51) Int. Cl.$^7$ ............................................... G09G 01/28
(52) U.S. Cl. ........................ 345/22; 345/88; 345/589; 345/593; 345/204; 348/655; 348/679
(58) Field of Search .............................. 345/22, 72, 88, 345/581, 589–594, 690, 204; 348/655, 659–661, 668, 674–675, 679, 686–687, 708; 702/107; 382/162, 167; 358/1.9, 507, 518, 519

(56) References Cited

U.S. PATENT DOCUMENTS

| | | | |
|---|---|---|---|
| 4,710,800 A | | 12/1987 | Fearing et al. |
| 4,875,032 A | * | 10/1989 | McManus et al. ........... 345/603 |
| 5,291,276 A | * | 3/1994 | Matsumoto et al. ........ 348/708 |
| 5,589,877 A | * | 12/1996 | Ikuzawa et al. ............ 348/186 |
| 5,821,917 A | * | 10/1998 | Cappels ....................... 345/589 |
| 6,313,823 B1 | * | 11/2001 | Cappels et al. ............. 345/589 |
| 6,337,692 B1 | * | 1/2002 | Rai et al. ..................... 345/594 |
| 6,388,648 B1 | * | 5/2002 | Clifton et al. ................ 345/88 |
| 6,476,793 B1 | * | 11/2002 | Motoyama et al. ......... 348/577 |

FOREIGN PATENT DOCUMENTS

| | | |
|---|---|---|
| JP | 6-38234 | 2/1994 |
| JP | 7-274014 | 10/1995 |
| JP | 8-163582 | 6/1996 |
| JP | 10-70734 | 3/1998 |
| KR | 97-4711 | 1/1997 |
| KR | 97-25029 | 5/1997 |
| KR | 1998-0013445 | 4/1998 |

* cited by examiner

Primary Examiner—Richard Hjerpe
Assistant Examiner—Henry N. Tran
(74) Attorney, Agent, or Firm—Robert E. Bushnell, Esq.

(57) ABSTRACT

A device and a method for controlling a video signal in a video display device controls a magnitude of an RGB video signal by controlling RGB gain values based on RGB count values controlled through external key inputs. The method comprises the steps of: reading the RGB gain values and the RGB count values stored in a storage part; receiving inputs of an RGB color selection key; receiving inputs of a level control key; reading count values of colors selected by the color selection key inputs, and controlling the read count values based on the level control key inputs; calculating difference values between the count values of colors controlled and the count values of the other colors read in the initial reading step by comparing the count values controlled based on the level control by inputs with the count value read in the first step, and controlling the RGB gain values according to the calculated difference values; and updating the storage part with the count values and the gain values controlled in the two preceding steps. As a result, the brightness is not greatly increased or decreased and constant color coordinates are maintained when the RGB gains are controlled by controlling the RGB gain values according to the difference values calculated by comparing the color count values controlled by a user with the other color count values not controlled.

22 Claims, 6 Drawing Sheets

DEVICE AND METHOD FOR CONTROLLING A VIDEO SIGNAL GAIN

CLAIM OF PRIORITY

This application makes reference to, incorporates the same herein, and claims all benefits accruing under 35 U.S.C. §119 from my application A METHOD OF CONTROLLING A GAIN OF A VIDEO SIGNAL IN A VIDEO DISPLAY SYSTEM filed with the Korean Industrial Property Office on Dec. 24, 1999 and there duly assigned Serial No. 62057/1999.

BACKGROUND OF THE INVENTION

1. Technical Field

The present invention relates to a device and a method for controlling a red, green and blue(RGB) video signal gain and, more particularly, to a device and a method for controlling a video signal gain, enabling R, G and B gain values to be controlled with difference values calculated through a comparison of count values of colors controlled by a user with count values of the other colors not controlled by the user.

2. Related Art

In general, the cathode ray tube (CRT) is widely used as a video display device due to a low price and an excellent display performance. Different amounts of electron beams, according to the intensity of a video signal, strike R, G, and B fluorescent materials coated on the surface of the CRT so that different colors with different brightnesses are displayed.

In general, various methods for controlling the gain of a video signal have been provided. However, such methods have been burdened by problems or disadvantages. For example, some methods are such that, in the case of a display having high brightness, that brightness exerts an adverse influence on focus of the display. Moreover, the brightness and color coordinates can become distorted. Other methods resolve some of the aforementioned problems, but cause other problems. For example, in such methods, the brightness becomes too low if all colors of the display have maximum values. Moreover, the brightness and color coordinates are still distorted as mentioned above relative to the first group of methods.

A method for varying some color gains based on difference values before and after varying the other color gains is disclosed in Japanese application No. 7-274014(laid-open date falls on Oct. 30, 1995) entitled "Method for Varying Display Colors". The latter discloses a computer system having a device for outputting a screen constituted with plural items capable of displaying colors, which includes: an input control part for setting color information in a memory after varying corresponding items based on a color variation instruction with respect to one arbitrary item provided by an input device; a variation control part for obtaining a variation value of color information after varying the corresponding item set in the memory by the input control part and reflecting the variation value to a color variation of other items; and an output control part for setting, in the memory, color information after varying a prior item based on control of a color variation based on the variation control part, and controlling a color variation output of the screen outputted based on the corresponding color information in the memory. However, the above invention(Japanese application No. 7-274014) has a problem, as in the second method described above, in that brightness and color coordinates are distorted, even though RGB gain values are actually varied at the same level.

SUMMARY OF THE INVENTION

In order to solve the above problems, it is an object of the present invention to provide a device and a method for controlling a video signal gain, enabling R, G, and B gain values to be controlled with difference values calculated through a comparison of count values of colors controlled by a user with count values of the other colors not controlled by the user.

In order to achieve the above object, the device according to the present invention comprises: a key input part having a color selection key and a level control key; a storage part for storing RGB gain values and RGB count values; a control part for reading the RGB gain values and the RGB count values from the storage part, for controlling count values of selected colors according to an input state of the color selection key and an input state of the level control key, for calculating difference values by comparing count values of the controlled colors with count values of the other colors not controlled, for controlling the RGB gain values according to the calculated difference values, and for updating the controlled count values and gain values in the storage part; and a video processing part for controlling a magnitude of the RGB video signal based on the RGB gain values controlled in the control part, and for displaying the controlled magnitude of the RGB video signal on a cathode ray tube.

In order to achieve the above object, the method for controlling a video signal gain in a video display device according to the present invention comprises the steps of: controlling the magnitude of an RGB video signal by controlling RGB gain values based on RGB count values controlled through external key inputs; reading the RGB gain values and the RGB count values stored in a storage part; receiving inputs from an RGB color selection key; receiving inputs from a level control key; reading the color count values selected by the RGB color selection key input and controlling the color count values according to the level control key input; calculating difference values through a comparison of the color count values controlled in the preceding step with the other color count values read from the storage part and controlling the RGB gain values according to the calculated difference values; and updating the count values and the gain values controlled in the two preceding steps.

Accordingly, by controlling the RGB gain values according to the difference values calculated through a comparison of color count values controlled by a user with the other color count values not controlled, the brightness is not greatly increased or decreased and constant color coordinates are maintained when the RGB gains are controlled.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Hereinafter, a device and a method according to an embodiment of the present invention will be described in detail with reference to the accompanying drawings.

Figure 1:
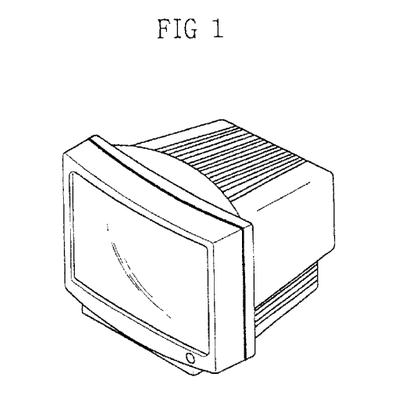
FIG. 1 is a perspective view showing a video display device in which a cathode ray tube is employed.

FIG. 1 is a perspective view showing a video display device in which a cathode ray tube is employed. In general, a video display device reproduces images on the screen of the cathode ray tube with an input of a video signal and a synchronization signal from a video card of a personal computer.

Figure 2:
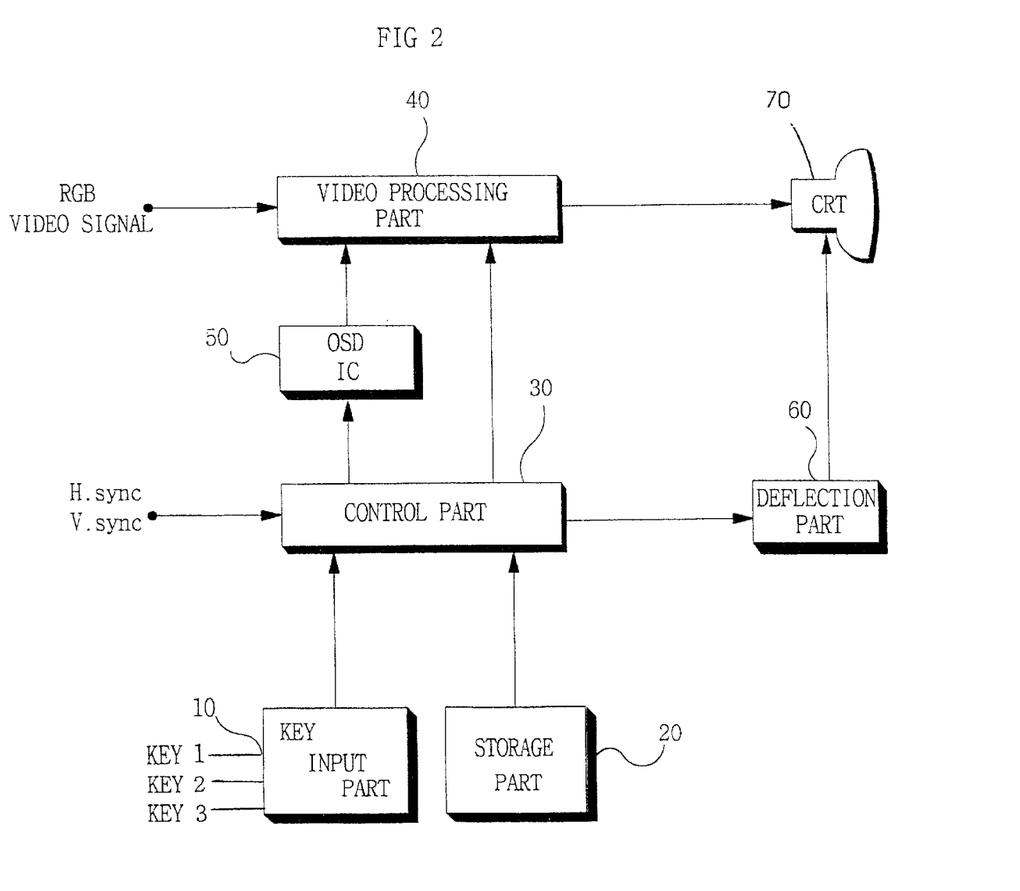
FIG. 2 is a block diagram showing the video display device of FIG. 1.

FIG. 2 is a block diagram showing the video display device of FIG. 1. As shown in FIG. 2, the video display device includes a key input part 10, a storage part 20, a control part 30, a video processing part 40, an on-screen display (OSD) part 50, a deflection part 60, and a cathode ray tube (CRT) 70.

As shown in FIG. 2, an RGB video signal inputted from a personal computer is applied to a cathode terminal of the cathode ray tube 70 after being amplified through video processing part 40 so that images are displayed on the screen.

The control part 30 outputs, to the video processing part 40, again value optimized according to the characteristic of the video display device, and the video processing part 40 amplifies a video signal according to the gain value and applies the amplified video signal to the cathode ray tube 70.

That is, since an RGB video signal inputted from a personal computer is a weak signal of lower than about 1 V, the RGB video signal is amplified to provide a signal of 30~50 V through the video processing part 40 in order to drive the cathode of the cathode ray tube 70.

In general, an on-screen display(OSD) function is built into a video display device and allows a user to directly control a display parameter, such as an RGB video signal gain control, a horizontal size control, a vertical size control, a contrast control, a brightness control, and so on.

That is, if a user presses a menu display key KEY1 for a display control, the control part 30 detects the pressing of the key KEY1 and controls the on-screen display part 50, so that the on-screen display part 50 displays a menu screen on the cathode ray tube 70 of the video display device. Again, if the user selects a particular-menu with a menu selection key KEY2 and varies a count value of the selected menu with a level control key KEY3, the control part 3 detects the varied count value and controls a corresponding circuit.

If the on-screen display part 50 outputs a fast blank signal and an RGB character signal through control of the control part 30 at a particular position timing, the video processing part 40 cuts off the RGB video signal with the fast blank signal and amplifies the RGB character signal for output.

Figure 3:
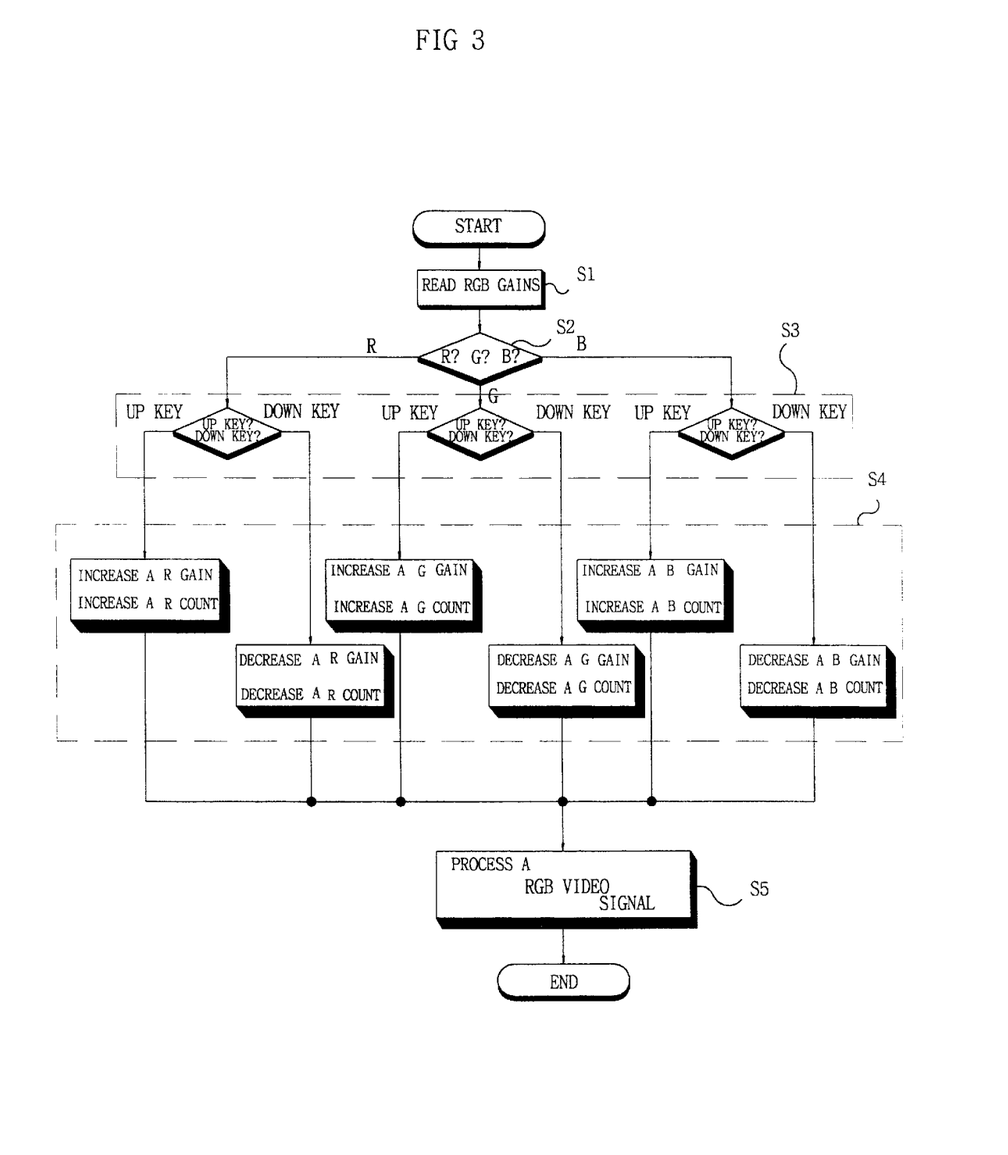
FIG. 3 is a flow chart showing a first method for controlling a video signal gain in a video display device.

FIG. 3 is a flow chart showing a first method for controlling a video signal gain in a video display device.

As shown in FIG. 3, the first method for controlling a video signal gain comprises the steps of: reading R, G, and B gain values stored in the storage part 20(S1); operating an RGB color selection key KEY2(S2); operating a level control key KEY3(S3); increasing or decreasing color gain values and count values selected by the key inputs in steps S2 and S3(S4); and transmitting the count values and gain values selected in step S4 to the on-screen display part 50 and the video processing part 40, and displaying the values on the screen while storing the values in the storage part(S5).

For example, if the color selection key KEY2 and the level up key KEY3 are operated by a user, the control part 30 increases all of the selected color gain values and count values according to the key inputs. Further, the increased gain values are transferred to the video processing part 40 and stored in the storage part 20.

Therefore, the video processing part 40 increases the magnitude of a video signal having corresponding colors by the increased gain values.

As for the above described first method, if gains are controlled in the case of a model having a high brightness, a problem is caused since the high brightness exerts an influence on the focus. Further, there exists a problem in that brightness and color coordinates are actually distorted, even though the RGB gain values are varied at the same level.

Figure 4:
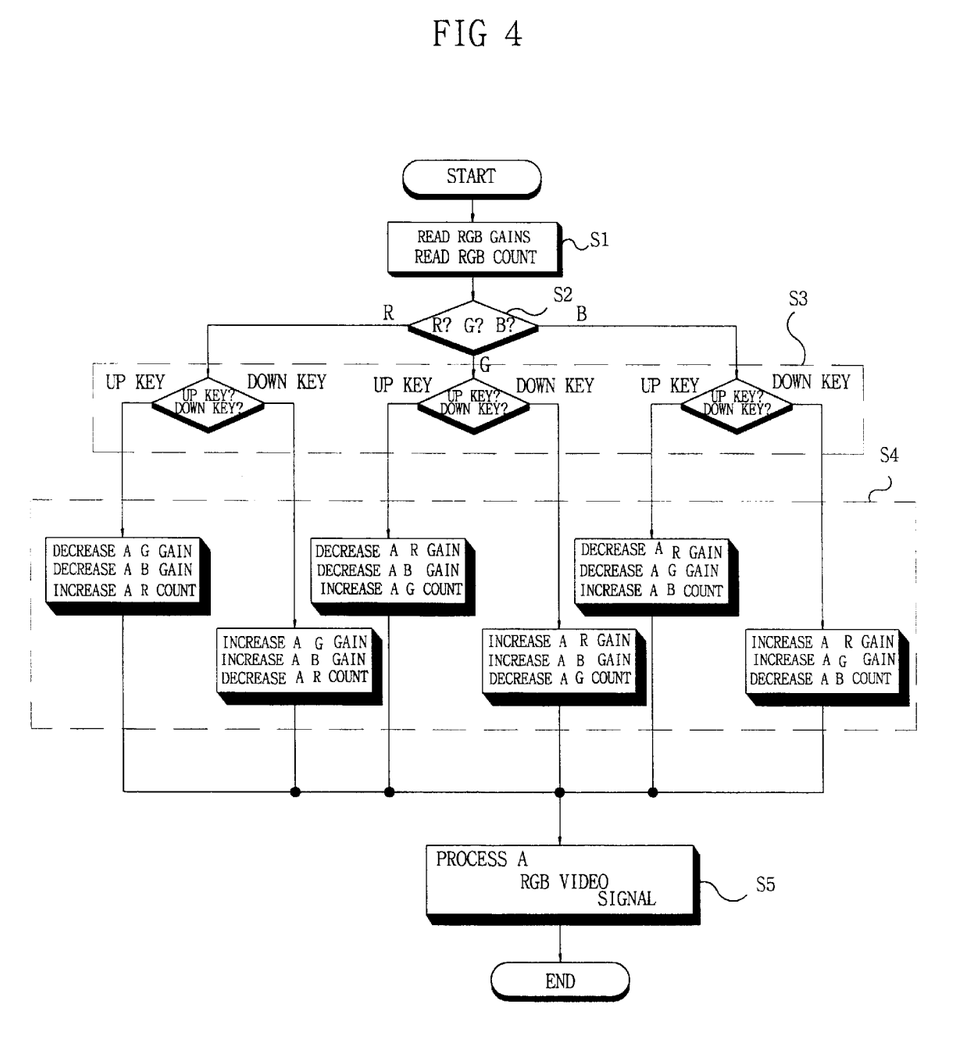
FIG. 4 is a flow chart showing a second method for controlling a video signal gain in a video display device.

FIG. 4 is a flow chart showing a second method for controlling a video signal gain in a video display device.

As shown in FIG. 4, the second method for controlling a video signal gain comprises the steps of: reading RGB gain values and RGB count values stored in the storage part 20(S1); operating an RGB color selection key KEY2(S2); operating a level control key KEY3(S3); increasing/decreasing the color count values and decreasing/increasing the other color gain values selected by the key inputs in steps S2 and S3(S4); and transferring the count values and gain values selected in step S4 to the on-screen display part 50 and the video processing part 40, and displaying the values on the screen while storing the values in the storage part 20(S5).

For example, if the color selection key KEY2 and a level up key KEY3 are operated by a user, the control part 30 increases the color count values selected according to the key inputs, and decreases the other color gain values, except for the selected colors. Further, the increased and decreased gain values are transferred to the video processing part 40, and are stored in the storage part 20. Accordingly, the selected colors seem to be relatively increased.

The second method improves the problem of deterioration of focus as the brightness gets higher, but causes another problem in that the brightness gets too low if all of the colors have maximum values. Further, there still exists a problem in that brightness and color coordinates are actually distorted if the RGB gain values are varied at the same level.

Returning to FIG. 2, in the device according to an embodiment of the present invention, the key input part 10 has a menu display key KEY1, a selection key KEY2, and a level control key KEY3. The storage part 20 stores RGB gain values, RGB count values, a maximum gain value, a gain value variation range, and a count value variation range. The control part 30 reads the RGB gain values and the RGB count values from the storage part 20, and controls count values of selected colors according to an input state of the color selection key KEY2 and an input state of the level control key KEY3. Control part 30 also calculates difference values by comparing count values of the controlled colors with count values of the other colors not controlled, controls the RGB gain values according to the calculated difference values, and updates the controlled count values and gain values in the storage part 20. The on-screen display part 50 displays a menu screen.

The control part 30 detects a color having the biggest count value by comparing of the count values of the controlled colors with the count values of the colors not controlled, sets the maximum gain value read from the storage part 20 as a gain value of the controlled color, calculates a first difference value by comparing of the count values of the controlled colors with the count values of the other colors not controlled, calculates a second difference value proportional to the calculated first difference value, and sets gain values of the other colors not controlled by decreasing the maximum gain value read from the storage part 20 by the calculated second difference value.

The control part 30 also calculates a ratio from the first difference value in the entire variation range of the count values read from the storage part 20, and calculates the second difference value corresponding to the calculated ratio in the entire variation range of the gain values read from the storage part 20.

Further, the control part 30 displays a menu screen through the on-screen display part 50 if the menu display key KEY1 is operated, displays the count values of selected colors read from the storage part 20 by controlling the on-screen display part 50 if the color selection key KEY2 is operated, and displays the count values of the controlled colors by controlling the on-screen display part 50 if the level control key KEY3 is operated.

Figure 5:
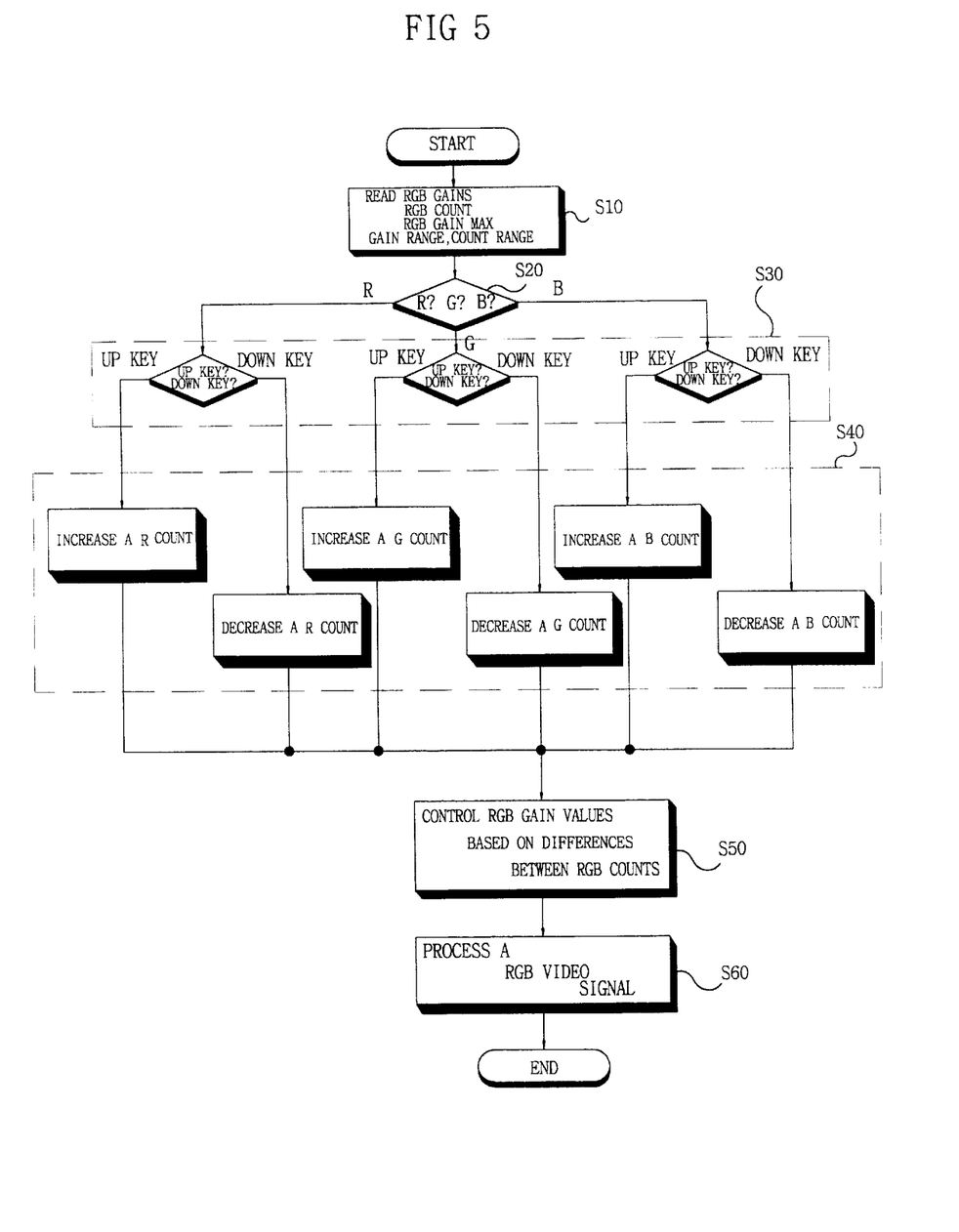
FIG. 5 is a flow chart showing a method for controlling a video signal gain in a video display device according to an embodiment of the present invention.
Figure 6:
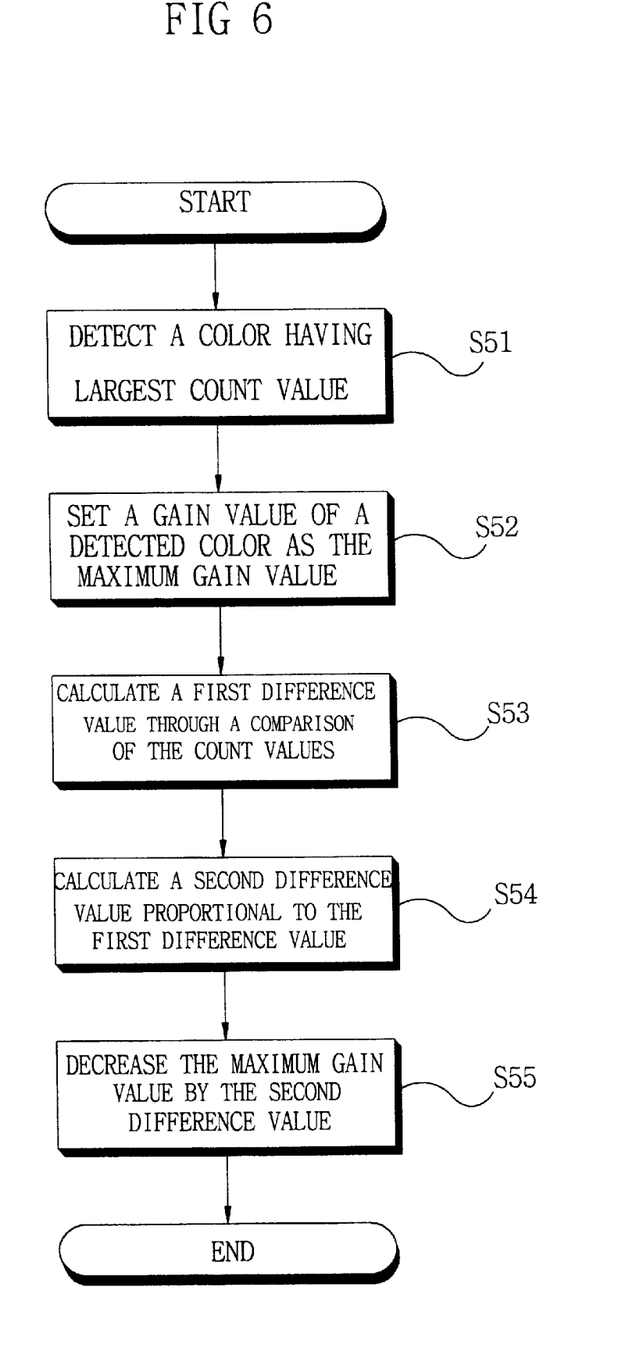
FIG. 6 is a flow chart showing in detail the RGB video signal process of FIG. 5.
Figure 7:
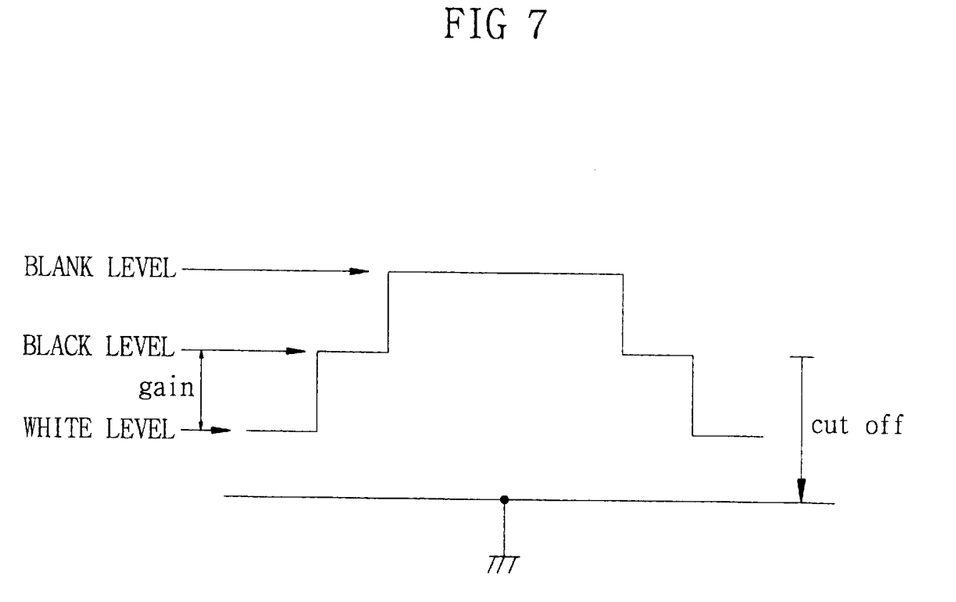
FIG. 7 is a waveform showing a video signal outputted from the embodiment of FIG. 5.

FIG. 5 is a flow chart showing a method for controlling a video signal gain in a video display device according to an embodiment of the present invention, and FIG. 6 is a flow chart showing in detail the RGB video signal process of FIG. 5.

As shown in FIG. 5, the method according to an embodiment of the present invention comprises the steps of: controlling the magnitude of an RGB video signal by controlling RGB gain values based on RGB count values controlled through external key inputs; reading the RGB gain values, the RGB count values, the maximum gain value, the gain value variation range, and the count value variation range stored in the storage part 20 (S10); receiving the inputs of the RGB color selection key KEY2 (S20); receiving the inputs of the level control key KEY3 (S30); reading the count values of the colors selected by the color selection key input of step S20 and controlling the read count values based on the level control key input of step S30 (S40); calculating difference values between the count values of colors controlled in step S40 and the count values of the other colors read from the storage part 20 in step S10 by comparing the count values in the step S40 with the count value in step S10, and controlling the RGB gain values according to the calculated difference values (S50); and updating the storage part 20 with the count values and the gain values controlled in steps S40 and S50.

In a preferred embodiment of the invention, step S50 includes the following substeps shown in FIG. 6: detecting a color of the largest count value through a comparison of the count values of the colors controlled in step S40 with the count values of the other colors read in step S10 (S51); setting a maximum gain value read in step S10 as a gain value of the color detected in the substep S51 (S52); calculating a first difference value by a comparing the count value of the color detected in substep S51 with the count values of the other colors read in step S10 (S53); calculating a second difference value proportional to the first difference value calculated in substep S53 (S54); and setting gain values of the other colors by decreasing the maximum gain value read in step S10 by the second difference value calculated in substep S54 (S55).

Substep S54 calculates a ratio from the first difference value calculated in substep S53 in the entire variation range of the count values read in step S10, and calculates the second difference value corresponding to the ratio calculated in the entire variation range of the gain values read in step S10.

Further, the device and method according to the embodiment of the present invention as stated above will be described in detail with reference to FIG. 2, FIG. 5, FIG. 6, and FIG. 7, the latter being a waveform showing a video signal outputted from the embodiment of FIG. 5.

First of all, if a user presses the menu display key KEY1, the control part 30 detects the press of the key KEY1, and the on-screen display part 50 displays a menu screen on the cathode ray tube 70.

The control part 30 then reads the RGB gain values, the RGB count values, the maximum gain value, the variation range of the gain values, and the variation range of the count values (S10), and controls the on-screen display part 50 to display the RGB count values, read from the storage part 20, on the menu screen.

The RGB gain values and the RGB count values are variable values, and the maximum gain value, the variation range of the gain value, and the variation range of the count values are fixed values. Assuming (for example) that the maximum gain value is "50", the variation range of the gain values is "20 steps", and the variation range of the count values is "100 steps".

In the meantime, the control part 30 detects an input state of the RGB color selection key KEY2, as well as an input state of the level control key KEY3 (S30). Accordingly, the control part 30 reads a count value of a color selected by the color selection key input of step S20, and controls the count value by the key input of step S30 (S40). For example, as in case 1 of Table 1 (below), the RGB count values are all "0" in the initial state wherein the RGB gain values are not controlled, and the RGB gain values are all set to the maximum gain value "50".

Then, if the R color is selected by the color selection key KEY2 (S20) and a decrease amount is inputted by the level down key KEY3 (S30), the control part 30 decreases the selected R count value by the decrease amount so that the controlled R count value becomes "25" (S40). Accordingly, the control part 30 detects a color having the largest count value by comparing the R count value controlled in step S40 with the GB count value read in step S10 (S51), and sets the maximum gain value read in step S10 as a gain value of a color detected in substep S51 (S52). That is, as in case 2 of Table 1, if an R count value is "25", a G count value is "0", and a B count value is "0", the R count value is set to a maximum gain value "50" (S52) since the R count value is the largest among them (S51).

Further, the control part 3 calculates a first difference value by comparing the count value of the color detected in step S51 with the count values of the other colors read in step S10 (S53), calculates a second difference value proportional to the first difference value calculated in step S53 (S54), and sets the gain values of the other colors by decreasing the maximum gain value read instep S10 by the second difference value calculated in the step S54 (S55). That is, since the R count value is "25", the G count value is "0", and the B count value is "0", as in (a) of the mathematical formula 1 below, a first difference value of the G color is "25" (S53).

At this time, since the variation range of the count values has 100 steps, as in (b) of the mathematical formula 1 below, the first difference value "25" takes one quarter of the entire variation range. Further, since the variation range of the gain values has 20 steps, as in (c) of the formula 1 below, and one quarter of the 20 steps of the entire variation range is "5", the second difference value is "5" (S54).

Accordingly, as in (d) of the formula 1, the G gain value is set to "45" by decreasing the maximum gain value "50" by the second difference value "5" (S55). The B gain value is also set to "45" according to the above method.

$$(a)\ 25-0=25\ (b)\ 25/100=\tfrac{1}{4}\ (c)\ 20\times\tfrac{1}{4}=5,\ (d)\ 50-5=45 \quad \{\text{formula 1}\}$$

TABLE 1

| case | R_count | R_gain | G_count | G_gain | B_count | B_gain |
|---|---|---|---|---|---|---|
| 1 | 0 | 50 | 0 | 50 | 0 | 50 |
| 2 | 25 | 50 | 0 | 45 | 0 | 45 |
| 3 | 50 | 50 | 0 | 40 | 0 | 40 |
| 4 | 75 | 50 | 0 | 35 | 0 | 35 |
| 5 | 100 | 50 | 0 | 30 | 0 | 30 |
| 6 | 100 | 50 | 25 | 35 | 0 | 30 |
| 7 | 100 | 50 | 50 | 40 | 0 | 30 |
| 8 | 100 | 50 | 100 | 50 | 100 | 50 |
| 9 | 50 | 50 | 50 | 50 | 50 | 50 |

If the control part 30 transmits the R gain value "50", the G gain value "45", and the B gain value "45", as controlled in step S50, to the video processing part 40, the video processing part 40 controls the magnitude of an RGB video signal based on the RGB gain value and displays that magnitude. At the same time, the control part 30 transmits the R count value "25", the G count value "0", and the B count value "0" to the on-screen display part 40 to be displayed on the menu screen. Further, the control part 30 stores the R gain value "50", the G gain value "45", the B gain value "45", the R count value "25", the G count value "0", and the B count value "0" in the storage part 20 (S60).

As stated above, according to the method of the present invention, by controlling the RGB gain values according to the difference values calculated by comparing color count values controlled by a user with the other color count values not controlled, the brightness is not greatly increased or decreased and constant color coordinates are maintained when the RGB gains are controlled.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A device for controlling a video signal gain, comprising:

a key input part having a color selection key and a level control key;

a storage part for storing RGB gain values and RGB count values;

a control part for reading the RGB gain values and the RGB count values from the storage part, for controlling count values of selected colors according to an input state of the color selection key and an input state of the level control key, for calculating difference values by comparing the controlled count values of the selected colors with count values of other colors not controlled, for controlling the RGB gain values according to the calculated difference values, and for updating the RGB gain values in the storage part using the calculated difference values; and a video processing part for controlling a magnitude of an RGB video signal based on the RGB gain values controlled in the control part, and for displaying the controlled magnitude of the RGB video signal on a cathode ray tube.

2. The device as claimed in claim 1, wherein the RGB gain values, the RGB count values, a variation range of a maximum gain value, and a variation range of the count values are stored in the storage part.

3. The device as claimed in claim 2, wherein the control part detects a color having the largest count value by a comparing of the controlled count values of the selected colors with the count values of the other colors not controlled, sets the maximum gain value read from the storage part as a gain value of the selected colors, calculates a first difference value by a comparing of the controlled count values of the selected colors with the count values of the other colors not controlled, calculates a second difference value proportional to the calculated first difference value, and sets gain values of the other colors not controlled by decreasing the maximum gain value read from the storage part by the calculated second difference value.

4. The device as claimed in claim 3, wherein the control part calculates a ratio from the first difference value in the entire variation range of the count values read from the storage part, and calculates the second difference value corresponding to the calculated ratio in the entire variation range of the gain values read from the storage part.

5. The device as claimed in claim 1, wherein the key input part further includes a menu display key.

6. The device as claimed in claim 5, further comprising an on-screen display part for displaying a menu screen.

7. The device as claimed in claim 6, wherein the control part displays the menu screen through the on-screen display part when the menu display key is operated, displays the controlled count values of selected colors read from the storage part by controlling the on-screen display part when the color selection key is operated, and displays the controlled count values of the selected colors by controlling the on-screen display part when the level control key is operated.

8. A method for controlling a video signal gain in a video display device for controlling a magnitude of an RGB video signal by controlling RGB gain values based on RGB count values controlled through external key inputs, comprising the steps of:

(a) reading the RGB gain values and the RGB count values stored in a storage part;

(b) receiving an input from an RGB color selection key;

(c) receiving an input from a level control key;

(d) reading count values of colors selected by the color selection key input and controlling the read count values based on the level control key input;

(e) calculating difference values between the count values of colors controlled in step (d) and the count values of the other colors read in step (a) by comparing the count values controlled in step (d) with the count values read in step (a), and controlling the RGB gain values according to the calculated difference values; and (f) updating the storage part of the video display device using the count values and the gain values controlled in steps (d) and (e).

9. The method as claimed in claim 8, wherein the RGB gain values, the RGB count values, a maximum gain value, a variation range of gain values, and a variation range of count values are stored in the storage part and are read in step (a).

10. The method as claimed in claim 8, wherein step (e) includes substeps of:
(e1) detecting a color having a largest count value by comparing a count value of a color controlled in step (d) with count values of other colors read in step (a);
(e2) setting a maximum gain value read in step (a) as a gain value of the color detected in substep (e1);
(e3) calculating a first difference value by comparing the count value of the color detected in substep (e1) with the count values of the other colors read in step (a);
(e4) calculating a second difference value proportional to the first difference value calculated in substep (e3); and
(e5) setting the gain values of the other colors by decreasing the maximum gain value read in step (a) by the second difference value calculated in substep (e4).

11. The method as claimed in claim 10, wherein the substep (e4) calculates a ratio from the first difference value calculated in substep (e3) in the entire variation range of the count values read in step (a), and calculates the second difference value in correspondence to the calculated ratio in the entire variation range of the gain values read in step (a).

12. An apparatus for controlling a gain of an RGB video signal in a display device, said apparatus comprising:
key input means having a color selection key and a level control key for receiving key inputs;
storage means for storing RGB gain values and RGB count values; and
control means for reading the RGB gain values and the RGB count values from the storage means, for controlling count values of selected colors according to an input state of the color selection key and an input state of the level control key, for calculating difference values by comparing the controlled count values of the selected colors with count values of other colors not controlled, for controlling the RGB gain values according to the calculated difference values, and for updating the RGB gain values in the storage means using the calculated difference values.

13. The apparatus as claimed in claim 12, further comprising video processing means for controlling the RGB video signal based on the RGB gain values controlled in the control part, and for displaying the controlled RGB video signal on the display device.

14. The apparatus as claimed in claim 12, wherein the RGB gain values, the RGB count values, a variation range of a maximum gain value, and a variation range of the count values are stored in the storage means.

15. The device as claimed in claim 14, wherein the control means detects a color having a largest count value by comparing the controlled count values of the selected colors with the count values of the other colors not controlled, sets the maximum gain value read from the storage means as a gain value of the selected colors, calculates a first difference value by comparing the controlled count values the selrcted colors with the count values of the other colors not controlled, calculates a second difference value proportional to the calculated first difference value, and sets gain values of the other colors not controlled by decreasing the maximum gain value read from the storage means by the calculated second difference value.

16. The apparatus as claimed in claim 15, wherein the control means calculates a ratio from the first difference value in the entire variation range of the count values read from the storage means, and calculates the second difference value in correspondence to the calculated ratio in the entire variation range of the gain values read from the storage means.

17. The apparatus as claimed in claim 12, wherein said key input means further includes a menu display key, and said apparatus further comprises an on-screen display means for displaying a menu screen, and wherein said control means displays the menu screen through the on-screen display means when the menu display key is operated, displays the count values of selected colors read from the storage means by controlling the on-screen display means when the color selection key is operated, and displays the count values of the controlled colors by controlling the on-screen display means when the level control key is operated.

18. A method for controlling a gain of an RGB video signal, comprising the steps of:
(a) reading RGB gain values and RGB count values;
(b) receiving an input from an RGB color selection key;
(c) receiving an input from a level control key;
(d) reading count values of colors selected by the color selection key input and controlling the read count values based on the level control key input; and
(e) calculating difference values between the count values of colors controlled in step (d) and the count values of the other colors read in step (a) by comparing the count values controlled in step (d) with the count values read in step (a), and controlling the gain of the RGB video signal according to the calculated difference values.

19. The method as claimed in claim 18, further comprising step (f) of updating a storage part of a video display device using the count values and the gain values controlled in steps (d) and (e).

20. The method as claimed in claim 19, wherein the RGB gain values, the RGB count values, a maximum gain value, a variation range of gain values, and a variation range of count values are stored in the storage part and are read in step (a).

21. The method as claimed in claim 18, wherein step (e) includes substeps of:
(e1) detecting a color having a largest count value by comparing a count value of a color controlled in step (d) with count values of other colors read in step (a);
(e2) setting a maximum gain value read in step (a) as a gain value of the color detected in substep (e1);
(e3) calculating a first difference value by comparing the count value of the color detected in substep (e1) with the count values of the other colors read in step (a);
(e4) calculating a second difference value proportional to the first difference value calculated in substep (e3); and
(e5) setting the gain values of the other colors by decreasing the maximum gain value read in step (a) by the second difference value calculated in substep (e4).

22. The method as claimed in claim 21, wherein substep (e4) calculates a ratio from the first difference value calculated in substep (e3) in the entire variation range of the count values read in step (a), and calculates the second difference value in correspondence to the calculated ratio in the entire variation range of the gain values read in step (a).

* * * * *